United States Patent [19]

Hartmann et al.

[11] Patent Number: 5,248,497
[45] Date of Patent: Sep. 28, 1993

[54] PRODUCTION OF PURIFIED IRON CHLORIDE BY A VACUUM PROCESS IN THE MANUFACTURE OF TITANIUM DIOXIDE

[75] Inventors: Achim Hartmann, Pulheim; Erwin Schmeir, Engelskirchen, both of Fed. Rep. of Germany

[73] Assignee: Kronos, Inc., Hightstown, N.J.

[21] Appl. No.: 925,769

[22] Filed: Aug. 7, 1992

[30] Foreign Application Priority Data

Sep. 17, 1991 [DE] Fed. Rep. of Germany ....... 4130808

[51] Int. Cl.$^5$ .............................................. C01G 49/10
[52] U.S. Cl. .......................................... 423/141; 423/83
[58] Field of Search ................. 423/69, 70, 82, 85, 423/138, 139, 140, 147, 77, 74, 76, 79, 78, DIG. 9, 141

[56] References Cited

U.S. PATENT DOCUMENTS

| | | | |
|---|---|---|---|
| 3,628,913 | 12/1971 | Uhland | 423/77 |
| 3,647,414 | 3/1972 | Nilsen | 423/83 |
| 3,944,647 | 3/1976 | Bonsack | 423/72 |
| 4,275,040 | 6/1981 | Davis | 423/82 |
| 4,519,988 | 5/1985 | Fridman | 423/76 |
| 4,540,551 | 10/1985 | Bonsack et al. | 423/77 |
| 5,063,032 | 12/1991 | Gueguin | 423/76 |

FOREIGN PATENT DOCUMENTS

| | | |
|---|---|---|
| 1206980 | 2/1984 | Fed. Rep. of Germany . |
| 59-121123 | 7/1984 | Japan . |

*Primary Examiner*—David Brunsman
*Attorney, Agent, or Firm*—Michael J. Cronin

[57] ABSTRACT

This invention provides a process for the recovery of purified ferrous chloride resulting as a by-product during the production of titanium dioxide by the chloride process. The process involves a two-step cooling of a filtered solution containing ferrous chloride and other material in a manner to crystallize the ferrous chloride as a pure product. Such product can then be sold commercially including to companies involved in the waste water treatment business.

7 Claims, No Drawings

PRODUCTION OF PURIFIED IRON CHLORIDE BY A VACUUM PROCESS IN THE MANUFACTURE OF TITANIUM DIOXIDE

This invention relates to a process for the recovery of purified ferrous chloride from a suspension resulting from the chlorination of a largely titaniferous raw material and which suspension contains essentially ferrous chloride, besides other metal chlorides, and water-insoluble constituents.

Ferrous chloride is produced in large quantities in the production of titanium dioxide by the chloride process. In this process, a titanium containing raw material, e.g. titanium slag, is chlorinated in the presence of coke as the reducing agent at temperatures of about 1000° C. in a fluidized-bed reactor. In addition to the resulting titanium tetrachloride, ferrous chloride is formed. The ferrous chloride together with water insoluble products - mainly coke, unreacted titanium dioxide and silicon dioxide - as well as other metal chlorides are separated from the vapours discharged from the reactor. The separated mixture is conventionally referred to as cyclone dust. Treatment of the cyclone dust is described for instance in U.S. Pat. No. 3,867,515.

It is also known that a ferrous chloride solution can be used as a precipitant and flocculant in the treatment of waste water. By slurrying the cyclone dust with water and separating the water-insolubles, a solution is obtained which contains chiefly ferrous chloride but also aluminium chloride, manganese chloride, magnesium chloride, zirconium tetrachloride and trace elements. If such a ferrous chloride solution is to be used for the clarification of waste water and for the conditioning of sludge, care must be taken to ensure that little to no such other chlorides and trace elements, which are inevitably contained in the solution because of the raw material composition, are passed into the waste water, since these chlorides and trace elements cause and involve disposal problems. Particularly nonadvantageous trace elements are chromium and vanadium.

The present discovery is based on solving the above problem and obtaining very pure ferrous chloride from the metal chloride solution as well as reducing its chromium and vanadium contents It has been unexpectedly discovered that the use of a vacuum in a cooling process can separate pure ferrous chloride in a crystalline form.

Said problem is solved by the process of this invention comprising the following steps:
- slurrying the solids mixture (cyclone dust) from the titanium process by the addition of liquid (water, dilute hydrochloric acid or similiar liquids), the quantity of the liquid being metered such that the iron concentration of the slurry attains a defined level;
- b) removing the water-insoluble constituents from the slurry by filtration or other means;
- c) evaporating the filtered solution under vacuum but only to an extent that chlorides do not crystallize in any substantial amount;
- d) cooling the filtered solution, at least initially under vacuum, ferrous chloride thus crystallizing; and then
- e) separating the crystals from the mother liquor.

The process of this invention in a simple way produces, from the cyclone dust obtained in large quantities in the production of titanium dioxide by the chloride process, a clean chemical substance suitable for the treatment of water and the conditioning of sludge. The economical reworking of the cyclone dust and the subsequent beneficial use of ferrous chloride is of substantial importance for the profitability of titanium dioxide production by the chloride process.

Besides profitability, the reliability of the process is of particular importance. In view of the large quantities of cyclone dust continuously generated, trouble-free reworking needs to be ensured in the long run.

Other important aspects of the process of this invention are the relatively simple equipment required and the moderate expense of energy.

The process of this invention produces a relatively coarse-particle crystalline ferrous chloride. The particle coarseness is of importance for this product since it would otherwise not be possible to achieve an increase in purity by washing.

The following describes the process in detail and by means of examples:

The amount of water added in slurrying the cyclone dust is controlled via the iron concentration of the slurry. The solution freed of water-insolubles should be adjusted preferably to a loading 10–11% divalent iron to minimize the energy requirement in subsequent evaporation.

In order to initiate the selective crystallization of ferrous chloride, the solution freed of the water-insolubles is first evaporated under vacuum. This step, which is of significance for the reduction of the chromium and vanadium contents, needs to be carried through under wide but defined conditions. For example, ferrous chloride is not precipitated at a pressure range of 260–290 mbar and a temperature of about 87° C., provided the iron concentration does not exceed 14%. These parameters of course vary with different pressures, temperatures and content rates. It is also possible to vary the process so that the condensate of the evaporation is partly returned into the slurry and partly used for washing the separated ferrous chloride crystals.

In the subsequent cooling still under vacuum, ferrous chloride is crystallized preferably in the form of a tetrahydrate into coarse crystals. It is advisable to then discontinue cooling since the evaporation of too much HCl would otherwise cause titanium salts and zirconium salts to hydrolyse from the solution.

In order to further increase the crystallization recovery and to evaporate no more HCl from the solution, further crystallization can be realized in a second step by indirect cooling to a lower temperature.

The resultant relatively coarse-particle ferrous chloride crystals are separated from the mother liquor preferably by centrifugation. The purity of the ferrous chloride crystals can essentially be improved by washing them; the high solubility of the crystals is a disadvantage however. It has been found to be particularly advantageous to use the acidic condensate obtained in evaporation for washing the crystals. 10–15% of the condensate quantity, related to unwashed salt, already have a substantial purifying effect. This quantity appears to be an optimum between purifying effect and recovery of the greatest possible quantity of the readily soluble ferrous chloride crystals.

The process of this invention achieves, in an economical way, a reduction factor of 87 for chromium and of 96 for vanadium, related to the iron content; see the following examples:

EXAMPLE 1

Chlorination residues (cyclone dust) obtained in the chlorination of titaniferous slag are slurried in hydrochloric acid of 2-2.5% concentration to obtain an iron content of 11% in the solution. The water-insolubles such as coke, quartz and titanium dioxide were separated by means of a membrane filter press. The clear remaining solution contains the following elements in the form of chlorides:

| | |
|---|---|
| iron | 10.96% |
| aluminium | 0.64% |
| manganese | 1.40% |
| vanadium | 0.28% |
| chromium | 0.14% |
| magnesium | 0.74% |
| niobium | 0.10% |
| zirconium | 0.18% |
| sodium | 0.40% |
| titanium | 0.10% |
| HCl | 2.20% |

100 kg of this solution are concentrated, in an evaporator at 270 mbar and 86° C., to an iron content of 13.5% in the solution, whereby 18.7 kg condensate of an HCl content of 8.3% and 81.3 kg crystal-free chloride solution are obtained.

The concentrated solution was pumped into an agitator vessel equipped with heat exchanger and vacuum connection. When vacuum is applied, the temperature, within 100 minutes, drops from 86° C. to 40° C. The final pressure was 27 mbar. This vacuum cooling produces 4.4 kg condensate with 4.4% HCl and 76.9 kg salt suspension. The salt suspension was then further cooled from 40° C. to 20° C., at normal pressure, within 77 minutes, by indirect heat exchange.

The coarse-crystal ferrous chloride (tetrahydrate) is separated from the mother liquor in a ploughing centrifuge (G=450) and is washed with 4.3 kg acidic condensate derived from the evaporation stage. 28.98 kg salt are obtained. Its particle size is characterized by the value $d_{36.8\%}=0.45$ mm. The salt now is essentially purer as can be seen from the following analysis FIGS.

| | |
|---|---|
| iron | 25.3% |
| aluminium | 0.03% |
| manganese | 2.5% |
| vanadium | 0.01% |
| chromium | 0.006% |
| magnesium | 0.03% |
| niobium | 0.01% |
| zirconium | 0.06% |
| sodium | 0.42% |
| titanium | 0.01% |

The salt contains no water-insoluble hydrolysis products. It could readily be used for water treatment since its chromium and vanadium contents are low. It is also suitable for use with magnetic carriers.

EXAMPLE 2

The filtered chloride solution described in Example 1 was evaporated to 88° C. at a pressure of 270 mbar. The evaporated solution contained fine-crystal salt. Crystallization, separation and washing was performed as described in Example 1. The characteristic d36.8% of the particle size attaining 0.25 mm was smaller than in Example 1. Chromium content was 0.018%, vanadium content was 0.03%. The solution contains no water-insoluble hydrolysis products. Because of the much higher chromium and vanadium loadings, this salt is unsuitable for water treatment.

EXAMPLE 3

Contrary to Example 2, the concentrated solution was cooled down under vacuum to 35° C. within 118 minutes (corresponding to 21 mbar). 4.7 kg condensate with 5.69% HCl was obtained. Since more HCl was evaporated, zirconium and titanium begin to hydrolyse. The salt suspension was further cooled down to 20° C. by indirect heat exchange and was then processed as described in Example 1. The salt of $d_{36.8\%}=0.4$ mm contained not only 0.017% chromium and 0.02% vanadium but also 0.18% water-insoluble hydrolysis product. The latter consisted of 73% zirconium compounds and of 27% titanium compounds.

The mother liquor derived from crystallization can be roasted in a known way in order to render it suitable for disposal. By the specific process of this invention a product, which would be difficulty to dispose of and costly to dump, was turned into a valuable product for water treatment.

The invention being thus described, it will be apparent that the same may be varied in many ways without being a departure from the spirit and scope of the invention, and all such modifications are intended to be included within the scope of the invention.

What is claimed is:

1. A process for the recovery of ferrous chloride contained in a suspension resulting from the chlorination of titaniferous raw material in the manufacture of titanium dioxide by the chloride process, comprising
    a) slurrying the suspension in a liquid selected from the group consisting of water, hydrochloric acid or mixtures thereof;
    b) removing from the suspension any water-insoluble constituents by filtration leaving a filtered solution;
    c) evaporating the filtered solution under vacuum but only to the extent that chlorides do not crystallize; and
    d) reducing the temperature of the filtered solution from the temperature at which step (c) is conducted, at least initially under vacuum, thereby crystallizing ferrous chloride.

2. The process of claim 1, wherein the quantity of the liquid is adjusted during slurrying so that the filtered solution contains an ferrous chloride concentration of between 8 and 11.5%.

3. The process of to claim 1, wherein the filtered solution is evaporated at a temperature up to 87° C. at a pressure range of 260-290 mbar.

4. The process of claim 1 wherein the liquid for slurrying the suspension is hydrochloric acid.

5. The process of claim 1 wherein removing the water insoluble constituents from the liquid is accomplished by filtration using a membrane filter press.

6. The process of claim 1, wherein cooling under vacuum is done in two steps, the first stop carried out at an intermediate temperature of about 40° C., which step is then followed by a second step in which cooling is at a lower temperature.

7. The process according to claim 6, wherein the lower temperature is about 20° C.

* * * * *